W. L. BODMAN.
TRACTOR.
APPLICATION FILED MAY 22, 1918.

1,342,791.  Patented June 8, 1920.
3 SHEETS—SHEET 1.

Walter Light Bodman
Inventor

By his Attorneys
Knight Bros

W. L. BODMAN.
TRACTOR.
APPLICATION FILED MAY 22, 1918.

1,342,791.

Patented June 8, 1920.
3 SHEETS—SHEET 2.

Inventor
Walter Light Bodman
By his Attorneys
Knight Bros

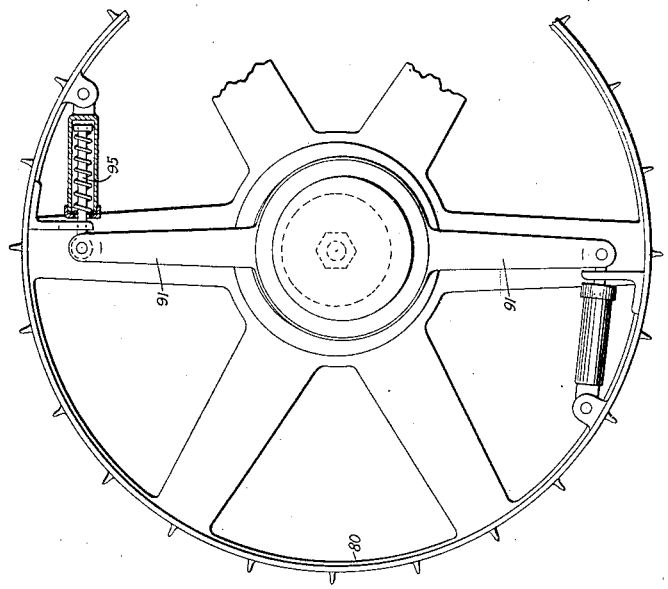
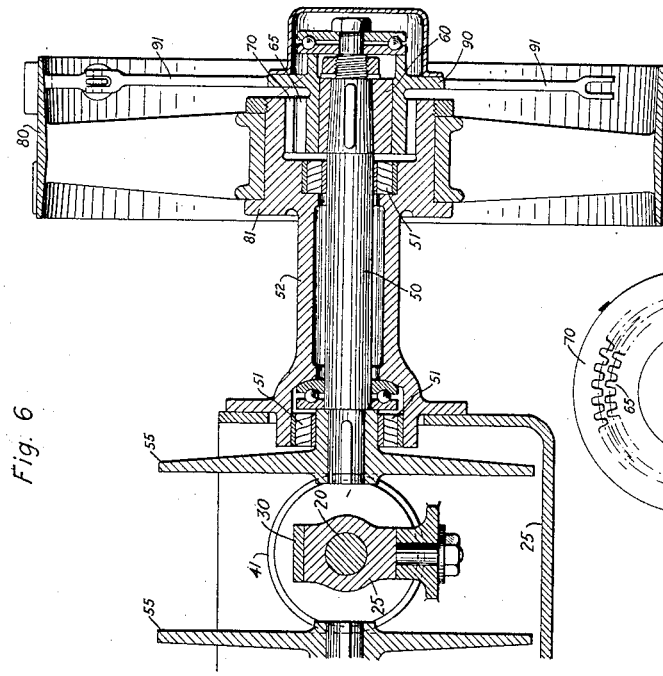
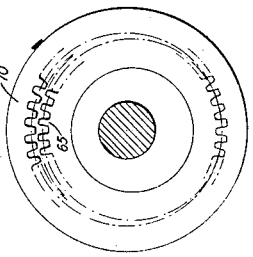

UNITED STATES PATENT OFFICE.

WALTER LIGHT BODMAN, OF BROMSGROVE, ENGLAND.

TRACTOR.

1,342,791.      Specification of Letters Patent.      Patented June 8, 1920.

Application filed May 22, 1918. Serial No. 235,967.

*To all whom it may concern:*

Be it known that I, WALTER LIGHT BODMAN, a subject of the King of Great Britain, residing at The Lydiate Ash, Bromsgrove, Worcestershire, England, have invented certain new and useful Improvements in Tractors, of which the following is a full and clear specification.

The present invention, which relates to improvements in agricultural tractors, has for its objects, first: the production of a relatively light and cheap machine, which can be constructed at a low cost of the commonest materials, without the sacrifice of the necessary power and strength, and second, the production of a simple design of machine that will afford ready accessibility to all unitary parts for repair or renewal and a reduction in size and weight of the machine to reduce to a minimum the required freight capacity for shipment.

With all tractors using positive gear transmission (unless the tractor is abnormally heavy) serious trouble is apt to develop when the lowest gear is used because of the tendency of the tractor to wind itself around the rear drive rather than move the load along resulting in the tractor rearing up and, in extreme cases, turning over backward. This condition is created by the provision of excessive power in light constructions with which it is difficult to distribute the load in front of the driving wheels. Some form of safety device is desirable to avoid this danger from which a great deal of trouble has been experienced in the field.

The present invention accomplishes the objects above pointed out and overcomes the described serious difficulty with light weight tractors as heretofore constructed.

The improved tractor includes any desired form of motor, but preferably a gasolene motor, which will give at least one impulse for every revolution, since working operations in the field call for a continual overcoming of inertia without any help from momentum. The crank shaft of the motor is connected through a double knuckle universal joint or other suitable form of flexible coupling with a short drive shaft section carrying two frictional drive wheels, which are adjustable at will upon the shaft section toward and from each other. The drive shaft section and friction wheels are supported between two driven friction disks, mounted respectively upon the inner ends of axle sections, which connect with the tractor supporting drive wheels through suitable epicyclic gear transmission. The drive shaft section and drive wheels are carried in a powerful bearing frame mounted upon a central pivot and provided with means to swing it to the right or the left upon the pivot for reversing the direction of the drive. Each friction drive wheel operates one driven disk and can be shifted from one to the other to drive forwardly or rearwardly. The epicyclic gear reduction preferably includes an eccentric fixed upon the driven axle section with a spur gear journaled upon said eccentric and operating within an internal gear fixed to the machine frame. The eccentrically mounted spur gear has a smaller number of teeth than the encircling internal gear, the difference in the number of teeth of the coöperating gears depending upon the desired gear reduction. Arms fixed upon the eccentrically mounted spur gear extend outwardly therefrom toward the rim of the tractor drive wheels to which they are connected in any suitable manner to effect the drive of said wheels and at the same time permit relative movement between the arms carried on the eccentric spur gear and the concentrically mounted tractor wheels. The connection between said arms and said tractor wheels are preferably spring devices which effectively take up shocks.

In order that my invention may be fully understood I will first describe the same with reference to the accompanying drawing and afterward point out the novelty more particularly in the annexed claims.

In said drawings:

Fig. 6 is an enlarged detail transverse sectional view showing the reversible frictional drive, the eccentric gear differential and the spring driven tractor wheel, with the connections between the driving eccentric and concentrically mounted wheels;

Fig. 7 is a detail face view showing the intermeshing internal and external gear of the epicyclic transmission;

Fig. 8 is an exterior view of the spring transmission for the driving tractor wheel.

Figure 1:
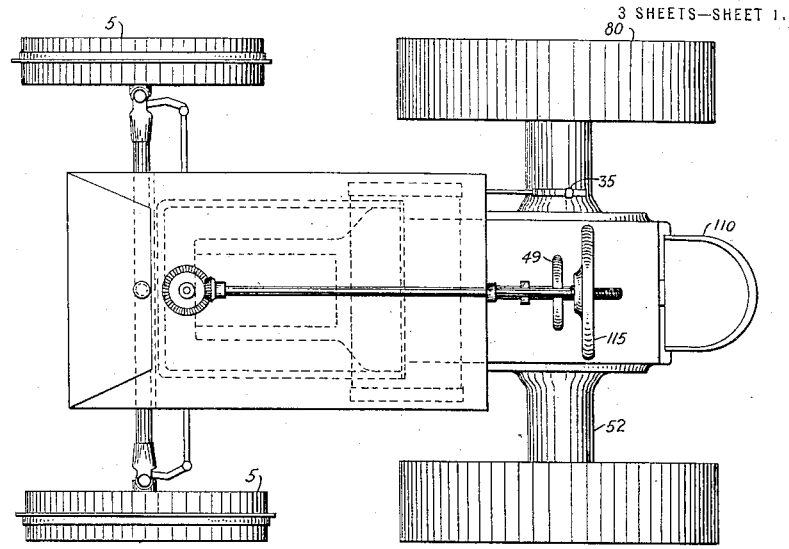
Figure 1 is a plan view of the improved tractor.
Figure 2:
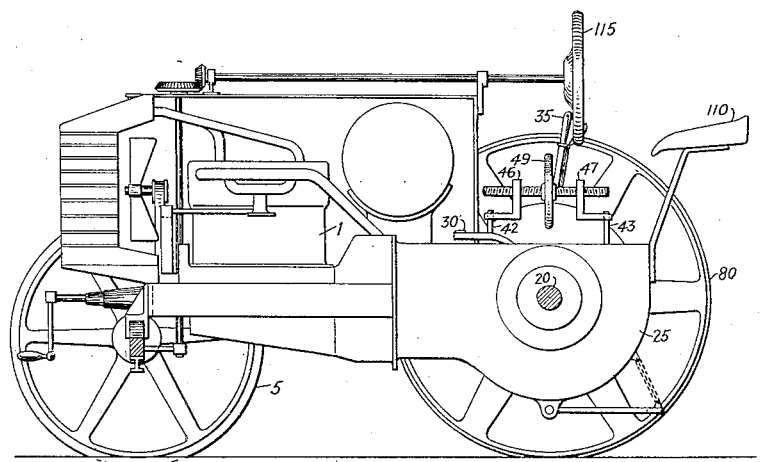
Fig. 2 is a side elevation thereof.
Figure 3:
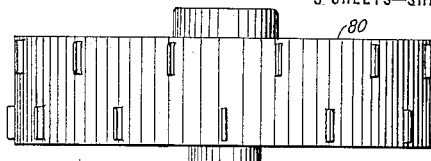
Fig. 3 is an enlarged plan view of the improved reversible friction transmission mechanism.
Figure 3:
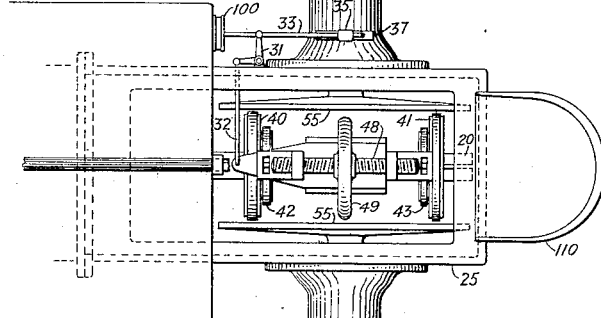
Figure 5:
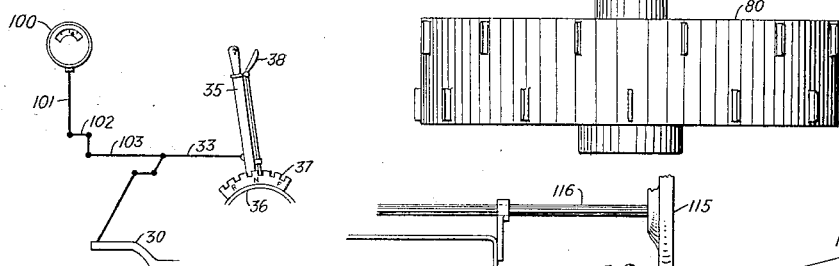
Fig. 5 is a detail diagrammatic illustration of the reversible control with a pressure indicating device attached.
Figure 4:
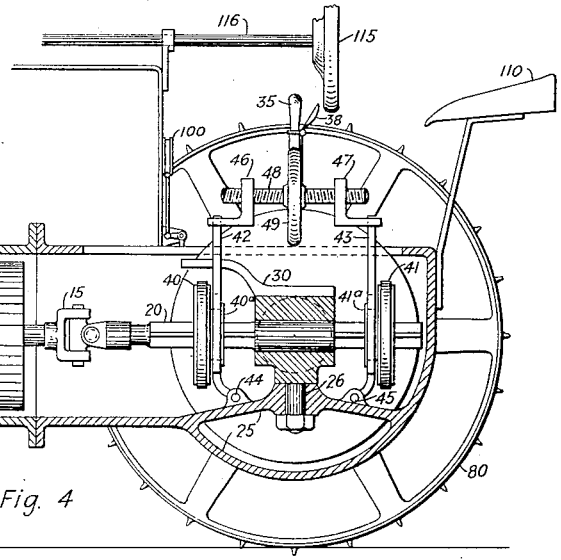
Fig. 4 is a vertical longitudinal sectional view of the transmission showing the controls for steering, reversing and changing speed.

The drawings illustrate my present improvements as applied to a relatively small four-wheel tractor, the front wheels being employed as the steering wheels and the rear wheels as the traction wheels, as is now commonly practised. A gasolene engine indicated at 1 is suitably mounted in the forward part of the tractor frame above the steering wheels 5. The details of the motor and accessories are immaterial to the present invention.

The crank shaft 10 carries the usual fly wheel and connects through a double knuckle universal joint 15 (or any other suitable form of flexible coupling) with the rear driving shaft section 20. This driving shaft section 20 is freely journaled in the heavy bearing frame 25 pivotally mounted at 26 in a part of the inclosing machine frame or casing, so as to allow the drive shaft section to be rocked laterally slightly for the purpose presently to be explained.

The bearing frame 25 has secured to it a forwardly projecting rigid arm 30 connected through a bell crank lever 31 and links 32, 33 with a main control lever 35. The lever 35 is pivoted at 36 upon the notched segment plate 37 and provided with a hand controlled dog 38 adapted to lock the lever in the desired adjusted position, so that the bearing frame 25, carrying driving shaft section 20 can be held in the position desired.

The driving shaft section 20 has freely splined upon it—in front and rear of the vertical plane of the pivot 26—the friction drive wheels 40, 41, each of which is formed with a grooved collar 40ª or 41ª engaged by a shifting fork 42 or 43 pivoted at 44 or 45 and suitably connected with the angular traveling members 46—47 threaded upon a control screw 48 having hand wheel 49. By rotating the screw 48 the friction drive wheels 40 and 41 can be simultaneously and uniformly shifted upon shaft 20 toward or away from each other, for the purpose hereafter explained.

The rear driving axle of the tractor is made in two sections 50, suitably journaled upon roller bearings 51 in the tubular frame portions 52 of the machine frame. Rigidly fixed upon the inner end of each of the axle sections 50 is a friction driven disk 55, the two disks 55 being presented in parallel vertical planes upon opposite sides of the drive wheels 40, 41 and at a sufficient distance apart to allow the drive wheels to rotate out of contact with the driven disks when the drive shaft section 20 is in its central or neutral position. When shaft section 20 is shifted by the means explained it will be observed that drive wheel 40 will be thrown into frictional engagement with one of the driven disks 50 while the drive wheel 41 will be thrown into frictional engagement with the other driven disk 50, and since the drive wheels engage the driven disks upon opposite sides of their axis of rotation they will cause the disks to rotate in the same direction. The driven disks will be rotated in one direction for one position of the drive wheels, and will be reversed when the shaft section 20 is shifted to reverse the action of the drive wheels. In this simple manner the driven disks can be rotated forward or backward without reversing the engines and without the use of a clutch in the ordinary sense.

By operating the adjusting screw 48, the drive wheels 40, 41 can be adjusted diametrically over the faces of driven disks 50, thereby affording a simple and convenient means of changing speed at will without modifying the operation of the motor.

The outer end of each axle section 50 has keyed to it an eccentric 60, upon which is freely journaled a spur gear 65 which operates within an internal gear 70 rigidly keyed in the cylindrical recess of the outer end of tubular frame portion 52. The internal gear 70 is concentric with the axis of rotation of axle sections 50 and is formed with a larger number of teeth than the spur gear 65 with which it is in mesh. The difference in the number of teeth depends upon the amount of reduction desired in the epicyclic gear.

80 are the driving tractor wheels suitably journaled upon the hub bearings 81 and confined in place by any suitable means.

The spur gear 65 has suitably secured to it a spider 90 formed with two or more approximately radial arms 91 extending nearly to the rim of traction wheel 80. Each of the spider arms is connected through a short connecting rod 95 with the rim of the traction wheel. These connecting rods are shown as spring devices affording a spring drive for the wheels and allowing relative radial play between the concentrically mounted driving wheel and the eccentrically mounted spur gear of the epicyclic transmission.

The machine frame or running gear of the tractor is shaped into a suitable casing to entirely inclose the main operating parts of the friction drive and transmission. The friction drive is divided so that each tractor drive wheel is operated independently of the other.

In many forms of frictional driving mechanisms the driving wheels are held in contact with the driven disks by spring pressure. This is objectionable not only because of the excessive wear produced by the chattering of the parts but also because of the inability to get the best frictional pressure with the use of the springs, since the springs are apt to be either too light or too heavy. To maintain proper pressure between the friction drive wheels and the driven disks I depend upon the hand operated control lever and segment for positively locking the adjustable drive shaft section in the desired position. This mechanism secures the best action and to enable the operator to follow instructions to apply a given amount of pressure between the driving and driven frictional members I propose to employ a spring pressure indicator shown at 100, embodying a dial and pointer member operated through the proper connections 101, 102 and 103, with link 33 of the manual control. With this pressure indicator it will be understood that the operator can apply the required pressure to his friction drive to produce the best results and insure the greatest length of life of the mechanism.

110 is the driver's seat which is in convenient relation to the control lever 35 and speed changing wheel 49. 115 is the steering wheel mounted on the rear end of the steering shaft 116 geared at front with the vertical steering shaft in the usual manner.

The simplicity of construction enables me to produce a tractor of satisfactory power at relatively small cost, which will require the minimum freight facilities for transportation. The simplicity of the machine enables it to be surely and effectively operated with the minimum of difficulty for maintenance. The provision of a frictional drive affords a safety device to avoid the rearing up of the machine referred to above, the friction drive devices being so designed that they will slip before raising the front part of the machine from the ground.

By dividing the frictional drive it is possible to transmit large horse powers without undue pressure and as the reduction in the final drive is controllable for large ratios a high peripheral velocity of the frictional portion can be maintained.

I consider an important feature of my invention to be the combining of the main frictional driving mechanism with the epicyclic reduction gear and the provision for correcting the eccentricity of the traveling spur gear through the driving connections with the tractor wheel. The whole structure is a compact and efficient structure for all around agricultural work. There is an effective and enormous reduction in speed through the epicylic gears. The construction is simplified to the greatest degree. The friction drive is theoretically correct as the maximum load is taken at the peripheries of the driven disks.

I claim:

1. In a tractor, the combination with a wheeled chassis supporting a motor, the traction wheels of which are independently journaled upon the chassis, of a sectional drive axle, epicylic reduction gearing between each axle section and one of said traction wheels, said gearing including a spur gear eccentrically journaled upon an axle section, radially yielding connections between said eccentrically journaled gears and said traction wheels, and a divided friction drive between the sectional axle and motor.

2. In a tractor, the combination with a wheeled chassis supporting a motor, the traction wheels of which are independently journaled upon the chassis, of a sectional drive axle, epicylic reduction gearing between each axle section and one of said traction wheels, said gearing including a spur gear eccentrically journaled upon each axle section, arms projecting from said eccentrically journaled gears, connecting rods between said arms and said traction wheels, and a divided friction drive between the sectional axle and motor.

3. In a tractor, the combination with a wheeled chassis supporting a motor, the traction wheels of which are independently journaled upon the chassis, of a sectional drive axle, epicylic reduction gearing between each axle section and one of said traction wheels, said gearing including a spur gear eccentrically journaled upon each axle section, arms projecting from said eccentrically journaled gears, spring devices connecting said arms and said driving wheels, and a divided friction drive between the sectional axle and motor.

4. In a tractor, the combination with a wheeled chassis supporting a motor, of the traction wheels journaled upon said chassis, suitable power transmission between the motor and traction wheels including a friction driven member and a friction driving member, manually operated controlling means for said friction driving member, and a pressure gage suitably connected with said controlling means to indicate the pressure exerted between the driving and driven friction members.

WALTER LIGHT BODMAN.